United States Patent
Forman et al.

(10) Patent No.: US 7,043,468 B2
(45) Date of Patent: May 9, 2006

(54) METHOD AND SYSTEM FOR MEASURING THE QUALITY OF A HIERARCHY

(75) Inventors: George H. Forman, Port Orchard, WA (US); Tom E. Fawcett, Mountain View, CA (US); Henri J. Suermondt, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 728 days.

(21) Appl. No.: 10/066,096

(22) Filed: Jan. 31, 2002

(65) Prior Publication Data

US 2003/0145009 A1 Jul. 31, 2003

(51) Int. Cl.
G06F 17/00 (2006.01)
G06N 5/02 (2006.01)

(52) U.S. Cl. .............................. 706/46; 706/45; 706/12
(58) Field of Classification Search .................. 706/46, 706/45, 12; 705/14
See application file for complete search history.

(56) References Cited

U.S. PATENT DOCUMENTS

| | | | | |
|---|---|---|---|---|
| 6,134,532 A * | 10/2000 | Lazarus et al. | ................ | 705/14 |
| 6,446,061 B1 * | 9/2002 | Doerre et al. | ................... | 707/3 |
| 6,859,831 B1 * | 2/2005 | Gelvin et al. | ................ | 709/224 |
| 2003/0144746 A1 * | 7/2003 | Hsiung et al. | ................ | 700/28 |
| 2004/0006566 A1 * | 1/2004 | Taylor et al. | ............... | 707/100 |

* cited by examiner

*Primary Examiner*—Joseph P. Hirl

(57) ABSTRACT

Method and system for measuring the degree of coherence of nodes in a hierarchy. A hierarchy that includes a plurality of nodes is received. A plurality of training cases are also received. Based on these inputs, a measure of coherence is determined for at least one node D in the hierarchy. The determination of the measure of coherence includes evaluation of the training cases with at least one feature under a local environment of node D and evaluation of the training cases with at least one feature under a subtree of the node D.

27 Claims, 5 Drawing Sheets

METHOD AND SYSTEM FOR MEASURING THE QUALITY OF A HIERARCHY

FIELD OF THE INVENTION

The present invention relates generally to hierarchies, and more particularly, to a method for measuring the quality of a hierarchy.

BACKGROUND OF THE INVENTION

Portals (e.g., Yahoo) arrange Web sites into a topic hierarchy in order to facilitate and aid a user in finding web sites of interest. FIG. 6 illustrates a portion of an exemplary topic hierarchy. In this topic hierarchy, there is a topic entitled "Health" and a sibling topic entitled "Entertainment". The "Health" topic has two sub-topics (or children nodes): "Diseases" and "Doctors". The "Entertainment" topic has two sub-topics: "Soccer" and "Chess".

Another use of a topic hierarchy is to organize content on a particular Web site. For example, HP (the assignee of the present patent application) organizes its technical notes and publications in hierarchies for ease of browsing.

Hierarchies are typically designed in the following manner. First, a user generates topics or categories into which the content may be filed, including their hierarchical relationships to one another. Second, content (e.g., web sites or technical articles) is placed under appropriate topics in the hierarchy. For example, each document is filed under one of the topics. As new documents become available, these new documents must also be filed under one of the topics. When a document does not appear to fit into any of the current topics, the user can then add new topics to the hierarchy. Similarly, the user can delete topics or modify current topics in the hierarchy or their arrangement. It is noted that whenever topics are added, deleted, or otherwise modified, the user must then evaluate whether any of the documents in the hierarchy need to be re-classified to a different topic.

As can be appreciated, this process of placing new content into the hierarchy and of maintaining the topics in a hierarchy is labor intensive. One can envision cases where it is not practical for human agents to perform the categorization of new content into the hierarchy because of the sheer volume of the documents or web sites that require categorization.

Some have suggested and attempted to utilize automated categorization programs that are based on text categorization technology from the field of artificial intelligence to automate the process of placing new content into the hierarchy.

Automated categorization programs that are based on machine learning operate in the following manner. First, a hierarchy of topics is provided to the automated categorization program. Second, training examples are provided to the automated categorization program. These training examples train the program to classify new content in a manner similar to how the training examples are classified into predetermined topics. Some examples of such automated categorization programs include the well-known Naïve Bayes and C4.5 algorithms, as well as commercial offerings by companies such as Autonomy Inc.

Unfortunately, the quality of the categorization generated by automated categorization programs depends on how well the automated categorization programs can "interpret" the hierarchy. For example, topics or categories that are sensible to a human user may confuse an automated categorization computer program. The topics "Chess" and "Soccer" can reasonably be grouped under the parent topic "Entertainment." However, it may be difficult, if not impossible, for an automated categorization computer program to find common words or other text that would suggest that both sub-topics "Chess" and "Soccer" should be under the topic "Entertainment."

In this regard, it is desirable for there to be a mechanism that analyses hierarchies and determines the quality of the arrangement of topics and corresponding documents for each place (e.g., particular topic subtree) in the hierarchy. This mechanism facilitates the design of hierarchies in such a way as to tailor the designed hierarchies so that automated categorization programs can place content therein in an efficient and accurate manner.

Based on the foregoing, there remains a need for a mechanism to determine a measure of coherence for the arrangement of hierarchically organized topics at each place in the hierarchy.

SUMMARY OF THE INVENTION

One aspect of the present invention is the provision of a method to determine a measure of coherence for the arrangement of hierarchically organized topics at each place in the hierarchy.

Another aspect of the present invention is the use of this measure of hierarchical coherence to design hierarchies that are tailored for automated categorization of content therein is described.

Another aspect of the present invention is the provision of a mechanism for determining a measure of coherence for the arrangement of hierarchically organized topics at each place in the hierarchy based on the distribution of features in a plurality of training cases filed into the hierarchy.

According to one embodiment, a method for determining a measure of coherence for the arrangement of hierarchically organized topics at each place in the hierarchy based on the distribution of features in a plurality of training cases filed into the hierarchy is described. The method measures the degree of coherence of all nodes in a hierarchy except leaf nodes and the root node. A hierarchy that includes a plurality of nodes (e.g., topics and sub-topics) is received. A plurality of training cases (e.g., documents appropriately filed into the hierarchy) is also received.

The following computation may be performed at each node in the hierarchy, except the root and the leaves: Based on the hierarchy and the training cases, determine a list of the most predictive features (e.g. words) that distinguish documents of the current node's sub-tree from those in its "local environment" (defined as the sub-trees of the current node's siblings as well as the parent node itself, if the parent contains any training cases). Optionally, any predictive features that are not represented fairly uniformly among the children subtrees of the current node based on the training cases under each child subtopic is eliminated from the list. If the list contains no features, assign a coherence value to indicate no coherence. Otherwise, assign a coherence value to indicate a level of coherence that depends on either the list of predictive features, their degree of predictiveness, their degree of prevalence, the degree of uniform prevalence among the node's subtopics, or a combination thereof.

Other features and advantages of the present invention will be apparent from the detailed description that follows.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

A method for determining a measure of coherence for the arrangement of hierarchically organized topics at each place in the hierarchy. This measure is referred to herein as "hierarchical coherence" or simply "coherence." is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The following notation is utilized herein. The notation "D^" refers to the entire subtree rooted at the topic/directory D. The notation "D@" refers to the directory D only, excluding its children/descendants.

Environment for Coherence Analyzer 110

Figure 1:
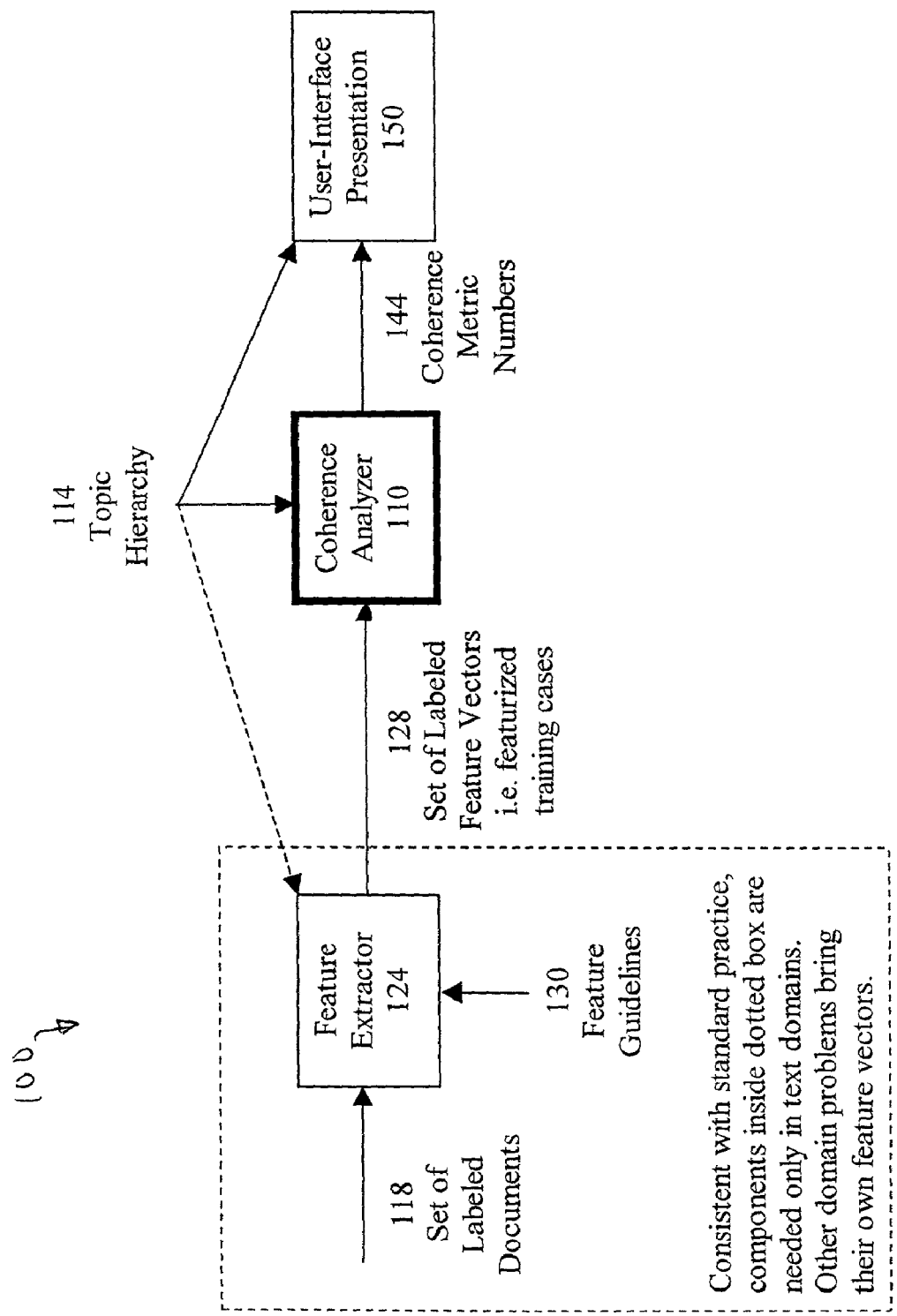
FIG. 1 illustrates an environment in which a coherence analyzer of the present invention may be implemented according to one embodiment of the present invention.

FIG. 1 illustrates an environment 100 in which a coherence analyzer 110 of the present invention may be implemented according to one embodiment of the present invention. The environment 100 includes a feature extractor 124, a coherence analyzer 110, and a user-interface presentation unit 150. The feature extractor 124 generates a set of labeled feature vectors 128, which can be, for example, training cases, based on a set 118 of labeled documents (hereinafter referred to also as training cases) or feature guidelines 130. As used herein, the term "labeled" indicates that each training case, feature vector, or document is annotated with a node of the hierarchy where it should be filed. It is noted that the feature extractor 124 is needed for text domains. However, the feature extractor 124 may not be included for other domains where the training items contain a pre-prepared vector of features, such as in categorizing terrain types in satellite images by the values of neighboring pixels, or in recognizing postal zip code digits where the input data has already been converted to a feature vector. The user-interface presentation unit 150 receives the coherence metric numbers 144 from the coherence analyzer 110 and generates a graphical display of the same for viewing by a user. It may, for example, sort the nodes by the assigned coherence metric to present the user with a list of the most or least coherent nodes.

The coherence analyzer 110 includes the following inputs. The coherence analyzer 110 includes a first input for receiving a hierarchy of topics 114 and a second input for receiving a set of labeled feature vectors 128. Based on these inputs, the coherence analyzer 110 generates a measure of coherence 144 for the arrangement of hierarchically organized topics at each place in the hierarchy (e.g., coherence metric numbers).

Examples of a hierarchy of topics 114 include, but are not limited to, a directory hierarchy or email folder hierarchy. An example of training cases 118 that are filed under the topics include documents, such as text files or Web pages in directories, or emails in folders. It is noted that training cases 118 as described hereinafter with reference to embodiments of the present invention refer to documents. However, training cases 118 can include any type of training case or training example.

Features

In situations where the training cases 118 have not previously been reduced to a set 128 of features, a standard and necessary pre-processing step to the coherence analyzer 110 includes a feature extractor 124 for decomposing each document into a set 128 of features. The set 128 of features can be, for example, the individual words of each document. In one embodiment, guidelines 130 may be provided to the feature extractor 124, and the feature extractor 124 generates a set 128 of features based on the guidelines. A user may program these guidelines 130. For example, the guidelines may specify that words are to be considered any consecutive sequence of alphanumeric characters that are forced to lowercase. Furthermore, the guidelines may specify a common "bag of words" model, selecting those words that occur in less than twenty-five percent (25%) of the documents, and that occur in more than twenty-five (25) documents overall). In another embodiment, in lieu of the previously described guidelines 130, a set of feature definitions (e.g., a given list of words to search for) is provided to the feature extractor 124.

A feature may be anything measurable about the document or training example. For example, in a hierarchy of foods a feature may be the percentage of USDA daily allowance of Vitamin B12 or grams of saturated fat.

In a hierarchy of documents, a set of features may be the individual words (e.g., single words and 2-word phrases) that occur in the set of documents, as with the standard "bag of words" model. In the preferred embodiment, the set of features includes Boolean indicators of the presence or absence of each word that appears in the training set, except those words that occur in greater than a predetermined percentage of documents and except those words that occur in less than a predetermined number of occurrences. By excluding the words that occur greater than a predetermined percentage (e.g., twenty percent) of all the documents, stopwords (e.g., "the" and "a"), which do not contribute to the coherence measure, are avoided. Similarly, rare words, such as those words that occur less than a predetermined number of times (e.g., 20 times overall) are excluded, since these words do not affect the coherence measure.

It is noted that a wide variety of feature engineering and feature selection strategies, known to those skilled in the art, may be employed to determine the set of features. For example, feature engineering may look for 2-word phrases or 3-word phrases or restrict attention to noun phrases only. Features may also be negated to create new features, for example, the a Boolean indicator whose "true" value indicates the absence of the word "fun" may be strongly predictive for the "Health" category. Other features can include, but are not limited to, document length, file extension type, or anything else about a document. Feature selection techniques can include selecting only those features with the highest "information gain" or "mutual information" metrics, as described in standard machine learning textbooks. Other feature engineering and feature selection strategies that are known to those of ordinary skill in the art may also be applied in determining a set of features for use with the training examples (e.g., documents).

Coherence Metric

The coherence analyzer 110 assigns a coherence metric number 144 for each place (e.g., node) in the hierarchy, except the root and leaves. The coherence measure or metric 144 can be any value in the range 0% to 100%, with 0% indicating no coherence and 100% indicating complete coherence. Values will typically fall between 20% and 80%.

The coherence measure 144 is an indicator of how "natural" the grouping of subtopics under a node is, with respect to the topics beside and immediately above that topic (i.e., whether the documents under the current topic's subtrees have shared features that distinguish them as a whole from the documents in its "local environment" (defined as the documents within sibling topics and documents assigned to the immediate parent). The coherence metric is not computed for the root node (which has no local environment) or for leaf nodes (which have no subtopics).

Figure 4:
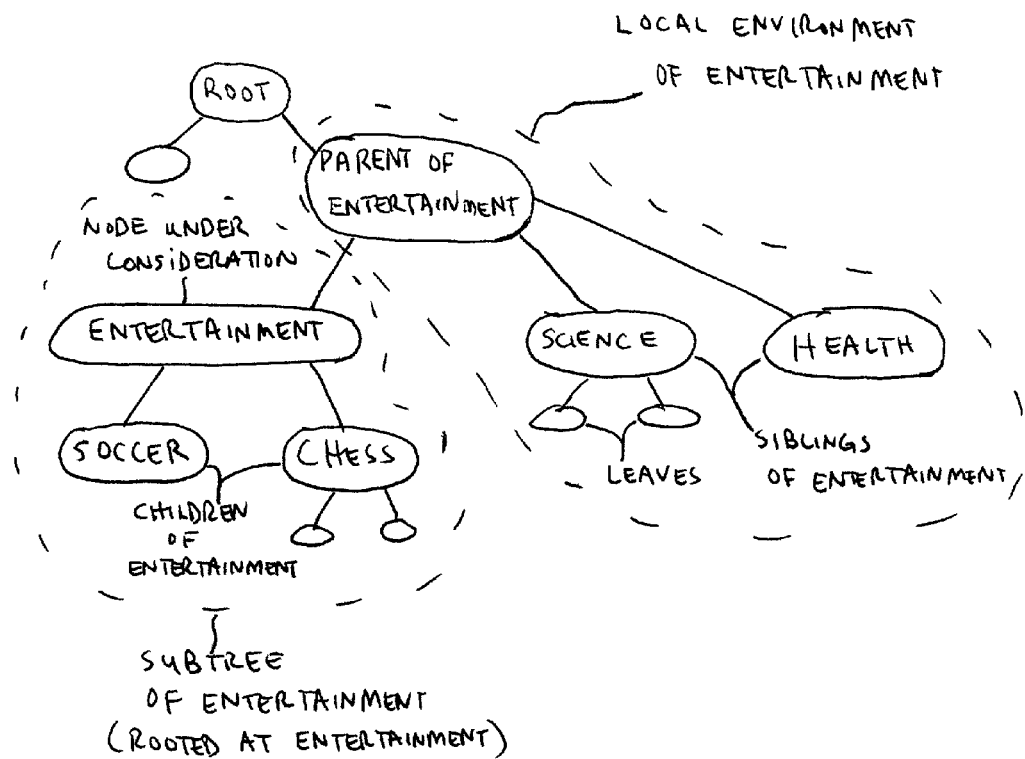
FIG. 4 illustrates an exemplary hierarchy.
Figure 6:
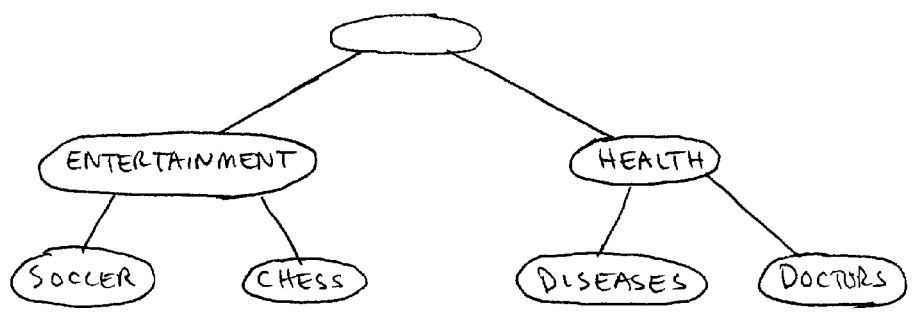
FIG. 6 illustrates a portion of an exemplary topic hierarchy.

For example, referring to FIG. 4, if the word feature "medicine" appears in 100% of the documents at or under the topic "Health" and does not occur very often in the documents under the topic "Entertainment", then the node "Health" would receive a hierarchical coherence of 1.0. Suppose that the only predictive feature for "Entertainment" is the word "fun" and that it appears in 60% of the documents under "Entertainment" and only very rarely under "Health." If the word "fun" occurs only under the subtopic "Soccer" and not under the subtopic "Chess" (i.e. non-uniform over subtopics), then the "Entertainment" node will have a low coherence (e.g., a coherence value (CV) of 0%). On the other hand, if the word "fun" occurs with roughly the same prevalence under both "Chess" and "Soccer" (uniformity), then the "Entertainment" node receives a hierarchical coherence of 60%.

Coherence Analyzer 110

Figure 2:
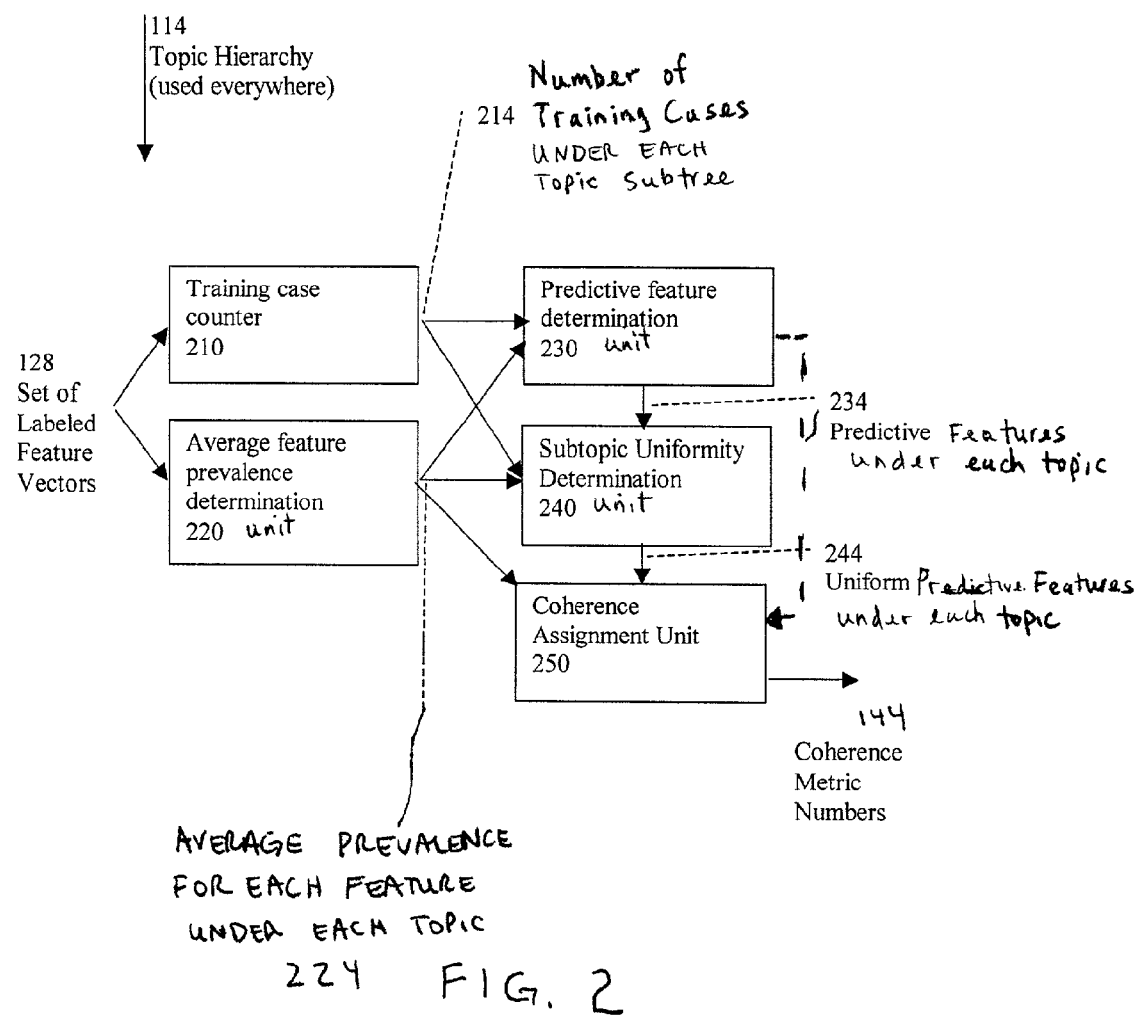
FIG. 2 is a block diagram illustrating in greater detail the coherence analyzer of FIG. 1.

FIG. 2 is a block diagram illustrating in greater detail the coherence analyzer 110 of FIG. 1. The coherence analyzer 110 further includes a training case counter 210 for determining the number 214 of training cases (e.g., documents in each subtree). The coherence analyzer 110 further includes an average prevalence determination unit 220 for determining each feature's average prevalence 224 (i.e., average value in the documents in the subtree). For example, determining that the word "chess" appears in 95% of the documents in a particular subtree.

The coherence analyzer 110 further includes a predictive feature determination unit 230 for determining a set of predictive features 234 under each topic, optionally annotated with a number indicating their degree of predictiveness. Specifically, the predictive feature determination unit 230 determines the individual features that are most predictive of the entire subtree rooted at the topic or directory D (referred to herein as D^) as compared with its siblings subtrees or its parent node. Predictive features 234 are those features whose presence indicates a much higher probability that the document belongs in the D^ subtree instead of in D's sibling subtrees or in D's parent node. A preferred method for generating predictive features 234 is described in greater detail hereinafter with reference to FIG. 3.

The coherence analyzer 110 further includes a subtopic uniformity determination unit 240 for determining which of the predictive features determined previously are also uniformly common among the subtrees and for each topic. The subtopic uniformity determination unit 240 generates a list of uniform predictive features 244 that may include a number to indicate their degree of uniformity. The coherence analyzer 110 also includes a coherence assignment unit 250 for generating a coherence measure 144 (e.g., a coherence metric number) based on a list of predictive features.

In one embodiment, the assignment of a coherence value to a current node is based on the list of predictive features, their degree of predictiveness, their degree of prevalence, their degree of uniformity, or a combination thereof. It is noted that the degree of uniformity reflects how evenly distributed the predictive features are among the children subtrees of the current node based on the training cases under each child subtree. A preferred method for generating a coherence measure is described in greater detail hereinafter with reference to FIG. 3.

Processing Steps

Figure 3:
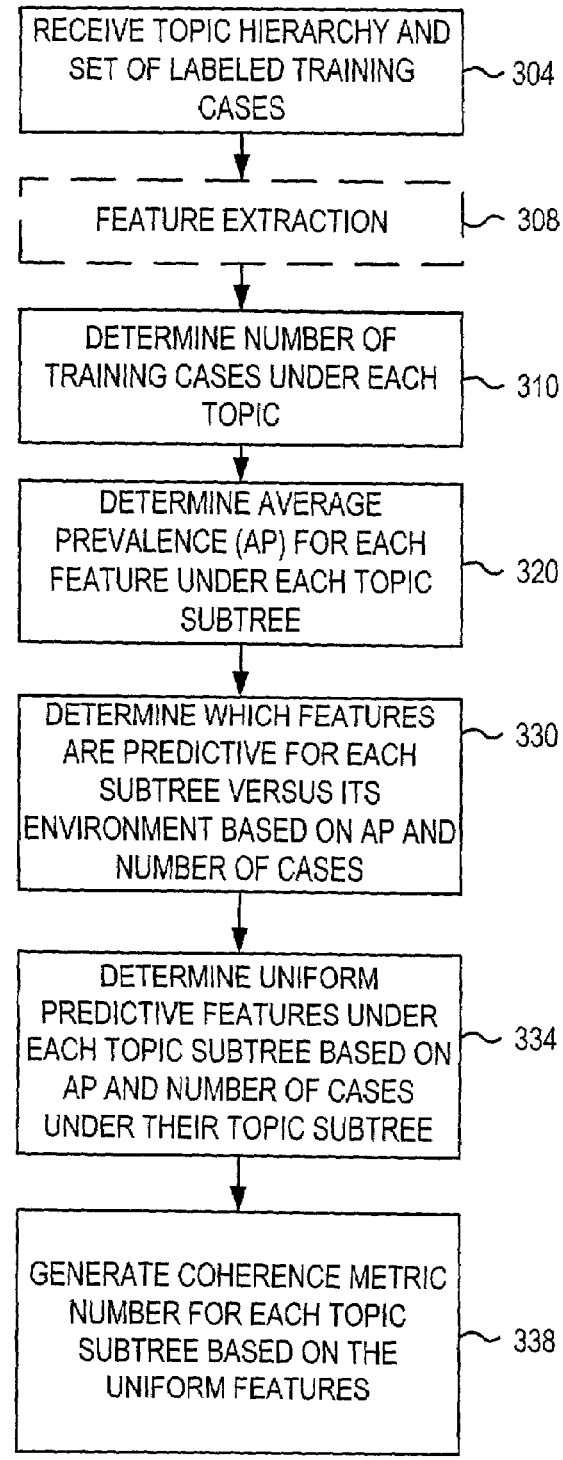
FIG. 3 is a flow chart illustrating the processing steps performed by the coherence analyzer of FIG. 1 in accordance with one embodiment of the present invention.

FIG. 3 is a flow chart illustrating the processing steps performed by the coherence analyzer of FIG. 1 and FIG. 2 in accordance with one embodiment of the present invention. In step 304, a hierarchy (e.g., a topic hierarchy) and a set of labeled training cases is received. The hierarchy is comprised of a plurality of nodes arranged in a tree. The plurality of nodes has at least one node under consideration (NUC). Each node under consideration has associated therewith its subtree and its "local environment" (i.e., its parent and the subtrees of its siblings), which is described hereinafter with reference to FIG. 4. The set of labeled training cases can be either documents or feature vectors. By "labeled" we mean that each training case is filed under a node of the hierarchy. If the training cases are documents (as opposed to feature vectors), each document is converted into a feature vector in processing step 308, which is referred to as feature extraction.

In step 310, the number of training cases (e.g., documents) under each topic subtree is determined. In step 320, the average prevalence (AP) for each feature under each topic subtree is determined (e.g., determining that the word feature "ball" appears in 90% of the documents under Soccer^).

In step 330, it is determined which features are predictive for each subtree versus the environment of the node under consideration based on the average prevalence and on the number of training cases. In a preferred embodiment, a statistical test, known as Fisher's Exact Test, is utilized. The Fisher's Exact Test provides more sensible results than Chi-Squared when the number of documents is small. To select a variable length set of the "most" predictive words, a probability threshold of, for example, 0.001 is utilized against the output of Fisher's Exact Test.

Alternative strategies for selecting the most predictive features (e.g., words) include employing metrics, such as lift, odds-ratio, information-gain, and Chi-Squared. As for selecting the "most" predictive, instead of selecting all those above some threshold, one might select the top 50 words or dynamically select the threshold. Other strategies that are known to those of ordinary skill in the art may also be utilized to select the most predictive words.

In step 334, it is determined which features that were selected in step 330 are also "uniformly common" among the subtrees. For example, the uniform predictive features for a topic are determined based on the average prevalence and the number of training cases under each of the subtrees of the topic. It is noted that in some embodiments, step 334 may be entirely absent.

In a preferred embodiment, whether a feature is "uniformly common" among the subtrees is determined by a "cosine similarity" test between the number of documents in each of the children subtrees and the feature occurrence counts in the subtrees. Those features with a cosine similarity greater than or equal to a threshold θ (in the preferred embodiment, we set θ to 0.90) are selected. Mathematically, features that meet the following criterion are selected:

$$\frac{dotproduct(F, N)}{length(F) * length(N)} >= \theta$$

where F is a vector representing the feature occurrence counts for each child subtree (from step 320), and N is a vector representing the number of documents for each child subtree (from step 310). An array of features that are sorted by this metric may be stored.

Other strategies known in the art for selecting features that are "uniformly common" include selecting those features whose average prevalence feature vectors have the greatest projection along the distribution vector among the children subtopics of D, or selecting features that most likely fit the null hypothesis of the Chi Squared test.

In step 338, for each directory D in the hierarchy, except the root and the leaves, a hierarchical coherence number is generated and provided as output.

It is noted that assigning a coherence value to the current node indicating the current node's level of coherence may be based on one or more of the following: a list of predictive features, the degree of predictiveness of the predictive features, the degree of prevalence of the predictive features, and the degree of uniformity of the predictive features among the current node's subtopics. The degree of prevalence in X^ indicates how frequently the word appears in documents under node X^. The degree of uniformity indicates how uniformly a word appears in each of X's subtopics, regardless of how prevalent the word is overall. It is noted that a feature that is deemed predictive does not automatically mean the feature is prevalent or uniform. For example, a feature may be predictive because it appears in 10% of X^ documents and in 0% of documents in X's local environment (i.e. not highly prevalent) and may appear in only one of X's subtopics (i.e. not uniform).

In one embodiment, a coherence value is assigned to a particular topic or directory based on the average prevalence of one or more predictive and uniformly common features in step 338. In this embodiment, the hierarchical coherence of directory D may be defined as the overall prevalence of those features selected previously. When no features are selected, then the hierarchical coherence number for directory D is assigned a zero value.

For example, the feature having the greatest cosine similarity (e.g., S[0] from the previous step) is selected, and the hierarchical coherence number is assigned the feature's average prevalence (from step 320) for the whole subtree D^.

In a preferred embodiment, the hierarchical coherence number is assigned an exponentially weighted average value over the most uniform features selected in the previous step. In other words, for the i-th feature [i=0.] from the sorted list recorded previously, a weighted average is computed of the feature average prevalence values (from step 320) using a weight of $e^{-i}$ (i.e. the following schedule of weights is used: 64%, 23%, 9% 3%, 1%). Because of the exponential fall-off, all remaining terms yield a fairly insignificant effect, and consequently, may be ignored. A weighted average value (e.g., an exponentially weighted average value) is utilized in this embodiment since there are some cases where it is not desirable for the metric to be dependent on a single feature alone. Moreover, a weighted average value prevents the metric from being overly sensitive to which individual features are selected in the feature extraction (step 124). Another reason for using a weighted average value is that certain features may have noise (e.g., the authors of a document may use synonyms for a concept). Other strategies include simply taking the average value of the top k features (k=1, 2, 3, etc.) or using other weighting schedules, such as 1/i.

Alternately, the determination of hierarchical coherence of step 338 may employ the maximum weighted projection of any feature selected in step 330. In another alternative embodiment, the determination of hierarchical coherence of step 338 employs the maximum average prevalence of any feature selected in step 330. In another alternative embodiment, the prevalence of each feature may be reduced by some degree based on how non-uniformly the feature is present in the child subtopics.

In another embodiment, there may be a post-processing step that outputs at each node D a mathematical aggregation function (e.g. sum, average, weighted-average, minimum, and maximum) of the coherence values that have been computed for its children nodes, thereby providing a measure of aggregated coherence that directly predicts the difficulty of choosing the correct subtree for a known-manner top-down or "Pachinko" classifier. With this extension to the method, a node that has many incoherent children has a low aggregate coherence value, suggesting a location in the hierarchy where a Pachinko classifier is likely to make many errors and/or need additional training examples. Under this post-processing step, the root is assigned an aggregate coherence value, and there is no aggregate coherence value for nodes whose children are all leaves.

Figure 5:
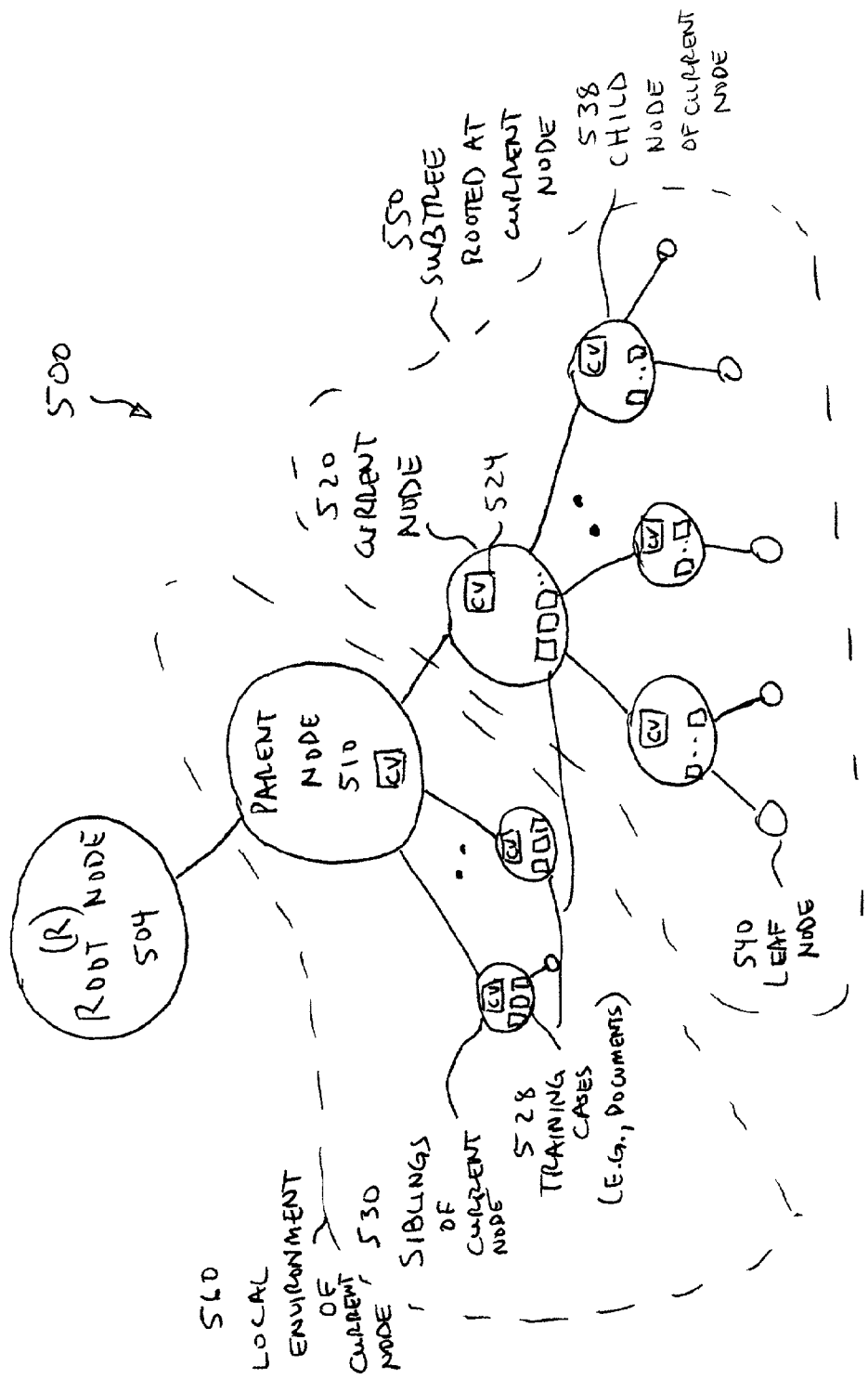
FIG. 5 illustrates an exemplary hierarchy with coherence measures assigned to each non-leaf node.

FIG. 5 illustrates an exemplary hierarchy with coherence measures assigned to each non-leaf node. The hierarchy 500 includes a root node 504, a current node 520, and a parent node 510 of the current node 520. The current node 520 includes a plurality of documents 528 or training cases and a coherence value (CV) 524. The current node 520 can have one or more sibling nodes 530, where each sibling node may have a corresponding sub-tree.

The current node 520 includes a subtree 550 that includes child nodes 538 and may include one or more leaf nodes 540. The subtree 550 is rooted at the current node. The coherence value 524 is an indicator of the existence of features (e.g., a keyword) that is common to the documents in the sub-tree 550 of the current node and yet distinguishes (e.g., uncommon) from the documents of the local environment 560 (i.e., documents in the siblings' subtrees and the documents in the parent node 510). The coherence analyzer 110 of the present invention generates a coherence value (CV) for each node in the hierarchy 500 except for leaf nodes and the root node.

It is noted that the predictiveness or a measure thereof may be determined by the training cases (e.g., documents) in the local environment 560 and the training cases in the subtree 550 of the current node.

Exemplary Applications

Some applications where the coherence analysis method of present invention may be applied include the organization of a set of hierarchical folders into which electronic mail may be sorted. An electronic mail software package, such as Microsoft Outlook or IBM Notes, may incorporate an automatic facility to categorize incoming electronic mail into hierarchical folders; such categorization may be improved by performing the coherence analysis method on the collection of folders periodically, and improving the organization of the hierarchy based on the results.

Another application for the coherence analysis method of present invention is in the organization of a topic hierarchy at a news service. Based on the results, incoming news articles (e.g., Reuters & AP articles) may be automatically categorized with greater accuracy into a topic hierarchy at news web sites such as CNN.com.

Yet another application for the coherence analysis method of present invention is in the organization of a directory hierarchy at a search engine website. For example, a Web crawler automatically inserts entries into the Excite or AltaVista directory hierarchies.

Yet another application for the coherence analysis method of present invention is a hierarchy of new products at a portal, such as Yahoo Shopping or UDDI hierarchical business directories.

In summary, the coherence analysis method of present invention may be useful in any scenario where statistical or machine learning techniques are utilized to automatically categorize items into a hierarchy.

As can be appreciated, the maintainers of any of the above applications desire the highest achievable accuracy by the categorizer. It is noted that mis-located documents are generally annoying and costly. The training and accuracy of an automated top-down classifier trained by machine learning (e.g. Pachinko machine classifier) is likely to perform better when the hierarchy is coherent (i.e., there are features or words that characterize whole subtrees). The present invention provides the maintainer a way to measure the hierarchical coherence at each node, thereby identifying the least coherent subtrees.

Once a coherence measure is assigned to each node of the hierarchy by the present invention, maintainers can utilize this information to re-arrange the hierarchy to be more coherent, thereby leading to greater accuracy by the categorization technology. Alternatively, the coherence measure may indicate certain nodes or topics or sub-topics, where more training examples added thereto may be needed to improve the performance of the classifier. In another scenario, the coherence measure may be utilized to choose or apply a particular technology to classify a particular portion of the hierarchy (e.g., sub-trees). In this manner, a fast, but less powerful classifier may be utilized to classify for those nodes that have a high coherence value. A slower, but more powerful classifier or classifying technology is employed to classify documents into those sub-trees with nodes with low coherence measure. In this manner, the classification may be performed in an efficient manner, and resources are intelligently selected to suit a particular task at hand.

Alternatively, places in the hierarchy exhibiting poor coherence may be dealt with by modifying the classifier's structure (e.g., by deviating from the given hierarchy only for the purpose of more accurate classification).

For example, referring to FIG. 4, suppose that the node Entertainment exhibited low coherence. For the purpose of top-down classification only, the children subtopics, Soccer and Chess, may be moved so that they attach directly to the parent of Entertainment. Alternately, supposing that the topic Entertainment contained many subtopics, and through a guessing or systematic search process, it is determined that eliminating the subtopic Chess greatly improves the coherence of topic Entertainment. Consequently, the subtopic Chess can be moved to be a sibling of Entertainment for the purpose of improving top-down classification accuracy.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

The invention claimed is:

1. A computerized method for measuring the a degree of coherence of the arrangement of nodes as in a hierarchy comprising the steps of:

a) receiving a predetermined hierarchy of nodes arranged in a tree format with one or more subtrees, wherein a subtree of one of the nodes includes any descendant nodes in the hierarchy that stem from the one node, the hierarchy of nodes includes at least a first node and a second node, and the nodes in the hierarchy are associated with one another as one of a sibling node, a child node, and a parent node, wherein the second node is a child node of the first node when the second node stems from the first node without any intervening node therebetween and the second node belongs in the subtree of the first node;

wherein the first node is a parent node of the second node when the second node is the child node of the first node and belongs in the subtree of the first node; and wherein the first node is a sibling node with the second node when the first and second nodes stem from a same parent node without any intervening node therebetween, and the first node and the second node belong to the subtree of the same parent node;

b) receiving a plurality of training cases that are filed under the nodes in the hierarchy; and c) responsive thereto for determining a coherence measure, for at least one of the nodes in the hierarchy that has a local environment, by evaluating the training cases filed in the subtree of the at least one node with respect to the training cases filed in the local environment of the at least one node;

wherein the local environment of the at least one node includes any parent node of the at least one node, any nodes that are sibling nodes of the at least one node, and any nodes that belong to the subtrees under the sibling nodes of the at least one node.

2. The method of claim 1 wherein the step of determining a coherence measure includes the steps of determining, for the subtree of the at least one nod, the number of the training cases filed in the subtree and the average prevalence of each feature in the training cases filed in the subtree;

determining, for the local environment of the at least one node, the number of the training cases filed in the local environment and the average prevalence of each feature in the training cases filed in the local environment;

determining predictive features that distinguish the subtree of the at least one node from the local environment of the at least one node; and generating a coherence value for the at least one node based on the average prevalence of at least one predictive features.

3. The method of claim 2 further comprising the steps of determining, for each of the predictive features, a degree of uniformity of the prevalence of the each predictive feature among the children subtrees of the at least one node;

and wherein the step of generating a coherence value for the at least one node is based on the degree of uniformity and the average prevalence of the at least one predictive feature.

4. The method of claim 1 wherein the hierarchy of nodes includes a topic hierarchy; wherein the nodes are topics; and wherein the training cases includes one of labeled documents and feature vectors assigned to the topics.

5. The method of claim 2 wherein the predictive features include at least one of words, multi-word phrases, noun phrases, document length, file extension type, and other parameters related to documents.

6. The method of claim 5, wherein the step of determining the predictive features includes the step of
computing at least one of information-gain metrics, mutual-information metrics, ChiS-quared, Fisher's Exact Test, lift, odds-ratio, word frequency among documents, and word frequency among all words in all of the documents.

7. The method of claim 3 wherein the step of selecting features that are uniformly common includes
the step of computing one of the metrics cosine-similarity, projection, and ChiSquared between the average feature prevalence vector and the vector of training case counts across subtopics of the at least one node, wherein the nodes in the hierarchy are topics and any child node of one of the nodes is also a subtopic of its parent node.

8. The method of claim 3 wherein the step of generating the coherence value includes the step of
generating a hierarchical coherence number by computing the average prevalence of the at least one predictive feature with the greatest degree of uniformity.

9. The method of claim 3 wherein the step of generating a the coherence value includes the step of
generating a hierarchical coherence number by computing a weighted-average of the average prevalence of at least two of the predictive features that are selected as both predictive and uniform.

10. The method of claim 9 wherein the step of generating the coherence value includes the step of
generating a hierarchical coherence number by computing a weighted-average of the average prevalence of the top k most prevalent of the predictive features that are selected as both predictive and uniform, wherein k is a predetermined positive integer.

11. The method of claim 10 wherein the weighted-average employs as the weighting schedule one of the negative exponential function exp(−I) and the inverse rank function (1/I), where I is the ordered rank of the top k most prevalent of the predictive features that are selected as both predictive and uniform.

12. The method of claim 3 wherein the stop of generating a the coherence value includes the step of
generating a hierarchical coherence number by computing an average value of the average prevalence of the top k most prevalent of the predictive features that are selected as both predictive and uniform, wherein k is a predetermined positive integer.

13. The method of claim 2 wherein the step of generating the coherence value includes the step of
generating a hierarchical coherence number by employing a maximum, over all of the predictive features, of a projection between the average feature prevalence vector and the vector of training case counts across subtopics of the at least one node, wherein the nodes in the hierarchy are topics and any child node of one of the nodes is also a subtopic of its parent node.

14. The method of claim 2 wherein the step of generating the coherence value includes the step of
generating a hierarchical coherence number by employing a maximum average prevalence of the predictive features.

15. The method of claim 1 further comprising the Step of:
assigning an aggregate-coherence value to a node in the hierarchy, based on an aggregation function of said determined coherence value over the node and of descendants of the node.

16. The method of claim 15 wherein the aggregation function includes one of a sum, average, weighted-average, minimum function, and maximum function.

17. The method of claim 2 further comprising the step of:
using the coherence values of one or more nodes in the hierarchy to modify the structure of the hierarchy to improve the coherence of the hierarchy.

18. The method of claim 2 further comprising the step of:
using the coherence values of one or more nodes to guide the selection of training cases for an automated classifier.

19. The method of claim 2 further comprising the step of:
using the coherence values of one or more nodes to select a suitable classification technology to be employed to automatically classify items in the hierarchy.

20. A computerized apparatus for measuring a degree of coherence of at least one considered node in a hierarchy of nodes that has associated therewith a subtree and a local environment in the hierarchy comprising:
a) a training case counter for determining the number of training cases under the subtree and the number of training cases for the local environment, the subtree includes any nodes in the hierarchy that stem, from the at least one considered node, and to local environment includes any parent node from which the at least one node is stemmed directly and is thus a child node of the parent node, any sibling nodes that are stemmed directly from the parent node of the at least one node, and any nodes that stem from to sibling nodes of the at least one node;
b) a predictive feature determination unit for determining a set of predictive features that distinguish training cases of the subtree from documents of the local environment;
an average prevalence determination unit for determining for at least one feature the average prevalence under the subtree and the average prevalence for the local environment; and
d) a coherence assignment unit for generating a coherence metric number for the at least one considered node based on at least one predictive feature.

21. The apparatus of claim 20 further comprising:
a subtopic uniformity determination unit for determining the uniformity of the distribution of the predictive features among children subtopics of the at least one considered node, wherein the nodes in the hierarchy are topics and any child node of one of the nodes is also a subtopic of its parent node;

wherein the coherence assignment unit generates a coherence metric number based on at least one predictive feature that is determined to be uniformly distributed among the children subtopics.

22. A computerized system for measuring the a degree of coherence of nodes in a topic hierarchy comprising:

a) a coherence analyzer unit for receiving the topic hierarchy and a set of labeled training cases filed under each of the nodes in the topic hierarchy and responsive thereto for determining, for at least one current node under consideration from the nodes in the topic hierarchy a coherence measure in the topic hierarchy of the at least one current node under consideration by evaluating the training cases and at least one feature under a local environment of the at least one current node and by evaluating the training cases and at least one feature under a subtree of the at least one current node under consideration;

wherein the subtree of the at least one current node under consideration includes any of the nodes in the topic hierarchy that stem from the at least one current node under consideration; and wherein the local environment of the at least one current node under consideration includes any of the nodes in the topic hierarchy that stem from a parent node from which the at least one current node under consideration is stemmed directly.

23. The system of claim 22 further comprising:

b) a user interface presentation unit coupled to the coherence analyzer unit for displaying the coherence measure for one or more current nodes under consideration.

24. The system of claim 22 further comprising:

b) a feature extractor coupled to the coherence analyzer for receiving a set of labeled documents and at least one feature guideline and responsive thereto for generating the set of labeled feature vectors.

25. The system of claim 22 wherein the coherence analyzer unit further comprises:

a_1) a training case counter for determining the number of training cases under a subtree of each of the nodes;

a_2) an average prevalence determination unit for determining the average prevalence for at least one feature under each of the node subtrees;

a_3) a predictive feature determination unit fur determining predictive features under each of the node subtrees; and a_4) a coherence assignment unit for generating coherence metric number based on at least one of the predictive features.

26. The system of claim 25 wherein the coherence analyzer unit further comprises:

a_5) a subtopic uniformity determination unit for determining the degree of uniformity in the distribution of one or more of the predictive features among the children of the at least on current node;

Wherein the coherence assignment unit generates a coherence metric number based on at least one of the predictive features that is deemed uniform based on the determined degree of uniformity of the at least one uniformity.

27. A computerized method for measuring a degree of coherence for one or more nodes in a hierarchy of nodes comprising the steps of:

a) receiving the hierarchy and the training cases filed into the hierarchy;

b) determining a list of predictive features that distinguish documents of a subtree of a first one of the nodes in the hierarchy from documents in the first node's local environment, wherein the first node's subtree includes any nodes in the hierarchy that stem from the first node, and the first node's local environment includes any parent node from which the first node is stemmed directly, any sibling nodes that are stemmed directly from the first node's parent node, and any nodes that stem from the sibling nodes of the first node;

c) assigning a coherence value to the first node-based on the list of predictive features and based on one or more of their degree of predictiveness, their degree of prevalence, and their degree of uniformity, wherein the degree of uniformity reflects how evenly distributed said predictive features are among the subtrees of the children nodes in the hierarchy that are directly stemmed from the first node based on the training cases under each of the subtrees of the children nodes.

* * * * *

UNITED STATES PATENT AND TRADEMARK OFFICE
CERTIFICATE OF CORRECTION

PATENT NO.         : 7,043,468 B2
APPLICATION NO. : 10/066096
DATED                  : May 9, 2006
INVENTOR(S)        : George H. Forman et al.

It is certified that error appears in the above-identified patent and that said Letters Patent is hereby corrected as shown below:

In column 10, line 22, in Claim 1, after "measuring" delete "the".

In column 10, line 23, in Claim 1, after "nodes" delete "as".

In column 10, line 60, in Claim 2, delete "nod," and insert -- node, --, therefor.

In column 11, line 5, in Claim 2, after "one" insert -- of the --.

In column 11, line 24, in Claim 6, delete "5," and insert -- 5 --, therefor.

In column 11, line 27, in Claim 6, delete "ChiS-quared," and insert -- ChiSquared, --, therefor.

In column 11, line 46, in Claim 9, delete "a" before "the".

In column 11, line 51, in Claim 10, delete "claim 9" and insert -- claim 3 --, therefor.

In column 11, line 64, in Claim 12, delete "stop" and insert -- step --, therefor.

In column 11, line 65, in Claim 12, delete "a" before "the".

In column 12, line 18, in Claim 15, delete "Step" and insert -- step --, therefor.

In column 12, line 45, in Claim 20, delete "stem," and insert -- stem --, therefor.

In column 12, line 46, in Claim 20, delete "to" and insert -- the --, therefor.

In column 12, line 51, in Claim 20, delete "to" and insert -- the --, therefor.

In column 12, line 57, in Claim 20, insert -- c) -- before "an".

In column 13, line 8, in Claim 22, after "measuring" delete "the".

In column 13, line 15, in Claim 22, insert -- , -- before "a coherence".

In column 13, line 36, in Claim 24, delete "b)" and insert -- c) --, therefor.

In column 14, line 1, in Claim 25, delete "fur" and insert -- for --, therefor.

UNITED STATES PATENT AND TRADEMARK OFFICE
CERTIFICATE OF CORRECTION

PATENT NO. : 7,043,468 B2
APPLICATION NO. : 10/066096
DATED : May 9, 2006
INVENTOR(S) : George H. Forman et al.

It is certified that error appears in the above-identified patent and that said Letters Patent is hereby corrected as shown below:

In column 14, line 13, in Claim 26, delete "on" and insert -- one --, therefor.

In column 14, line 14, in Claim 26, delete "Wherein" and insert -- wherein --, therefor.

Signed and Sealed this

Second Day of June, 2009

JOHN DOLL
*Acting Director of the United States Patent and Trademark Office*